United States Patent
Yasukawa et al.

(10) Patent No.: US 11,805,429 B2
(45) Date of Patent: Oct. 31, 2023

(54) CONTROL APPARATUS FOR GATEWAY IN MOBILE COMMUNICATION SYSTEM

(71) Applicant: SORACOM, INC, Tokyo (JP)

(72) Inventors: Kenta Yasukawa, Tokyo (JP); Ken Tamagawa, Tokyo (JP); Daichi Funato, Tokyo (JP)

(73) Assignee: SORACOM, INC., Tokyo (JP)

( * ) Notice: Subject to any disclaimer, the term of this patent is extended or adjusted under 35 U.S.C. 154(b) by 0 days.

(21) Appl. No.: 15/764,122

(22) Filed: Mar. 28, 2018

(65) Prior Publication Data

US 2019/0059005 A1 Feb. 21, 2019

Related U.S. Application Data

(63) Continuation of application No. PCT/JP2015/077610, filed on Sep. 29, 2015.

(51) Int. Cl.
*H04W 24/02* (2009.01)
*H04L 12/66* (2006.01)
(Continued)

(52) U.S. Cl.
CPC ............. *H04W 24/02* (2013.01); *H04L 12/66* (2013.01); *H04L 67/1031* (2013.01);
(Continued)

(58) Field of Classification Search
CPC ..... H04W 24/02; H04W 24/08; H04W 24/04; H04W 88/16; H04W 88/18; H04W 88/12;
(Continued)

(56) References Cited

U.S. PATENT DOCUMENTS 7,369,538 B1 * 5/2008 Ehlinger ................. H04L 12/66
370/352
7,996,525 B2 8/2011 Stienhans et al.
(Continued)

FOREIGN PATENT DOCUMENTS

CN 102984025 A 3/2013
CN 104539716 A 4/2015
(Continued)

OTHER PUBLICATIONS

Partial Supplementary European Search Report for European Patent Application No. 15905355.2 dated Mar. 22, 2019.
(Continued)

*Primary Examiner* — Un C Cho
*Assistant Examiner* — Rasha K Fayed
(74) *Attorney, Agent, or Firm* — Thomas| Horstemeyer, LLP (57) ABSTRACT

A control apparatus for a gateway functioning as the endpoint of a core network in a mobile communication system is provided. The gateway includes a first server configured to receive data from a user apparatus and one or more second servers configured to transfer the data received by the first server to an external network. The control apparatus performs an operation of changing performance of the one or more second servers, an operation of monitoring a processing status of the one or more second servers, and an operation of selecting, from the one or more second servers in accordance with the processing status of the one or more second servers, a second server as a transfer destination of the data received from the user apparatus by the first server.

10 Claims, 7 Drawing Sheets

(51) Int. Cl.
*H04L 69/08* (2022.01)
*H04L 67/565* (2022.01)
*H04L 67/1031* (2022.01)
*H04W 88/16* (2009.01)
*H04W 88/18* (2009.01)
*H04L 9/40* (2022.01)
*H04W 12/06* (2021.01)
*H04W 12/12* (2021.01)

(52) U.S. Cl.
CPC ............ *H04L 67/565* (2022.05); *H04L 69/08* (2013.01); *H04W 88/16* (2013.01); *H04L 63/0272* (2013.01); *H04L 63/083* (2013.01); *H04L 63/1483* (2013.01); *H04W 12/06* (2013.01); *H04W 12/12* (2013.01); *H04W 88/18* (2013.01)

(58) Field of Classification Search
CPC ..... H04W 88/08; H04W 12/12; H04W 12/06; H04W 84/18; H04W 84/12; H04W 4/206; H04W 4/02; H04W 4/20; H04W 4/21; H04W 4/025; H04W 4/18; H04W 4/70; H04W 64/00; H04W 76/022; H04W 76/12; H04L 67/1031; H04L 67/2823; H04L 67/1006; H04L 67/18; H04L 67/2804; H04L 67/1008; H04L 63/0272; H04L 63/083; H04L 63/1483; H04L 45/38; H04L 45/58; H04L 45/302; H04L 45/00
See application file for complete search history.

(56) References Cited

U.S. PATENT DOCUMENTS

| | | | |
|---|---|---|---|
| 8,190,740 B2 | 5/2012 | Stienhans et al. | |
| 9,071,677 B2 | 6/2015 | Aggarwal et al. | |
| 9,178,880 B1* | 11/2015 | Dotan | H04W 12/06 |
| 9,503,570 B2 | 11/2016 | Aggarwal et al. | |
| 9,629,060 B2* | 4/2017 | Arora | H04W 76/12 |
| 9,860,368 B2 | 1/2018 | Aggarwal et al. | |
| 10,674,007 B2 | 6/2020 | Aggarwal et al. | |
| 2001/0056493 A1* | 12/2001 | Mineo | G06Q 30/0241 709/227 |
| 2003/0158940 A1* | 8/2003 | Leigh | H04L 67/1002 709/226 |
| 2006/0095781 A1* | 5/2006 | Liu | H04L 63/083 713/183 |
| 2007/0005954 A1* | 1/2007 | Skemer | H04L 63/0428 713/153 |
| 2008/0076393 A1* | 3/2008 | Khetawat | H04W 16/16 455/411 |
| 2010/0169477 A1* | 7/2010 | Stienhans | G06F 9/5083 709/224 |
| 2010/0189117 A1* | 7/2010 | Gowda | H04L 45/586 370/401 |
| 2010/0318631 A1* | 12/2010 | Shukla | H04L 61/1511 709/219 |
| 2011/0202658 A1* | 8/2011 | Okuno | H04L 45/38 709/245 |
| 2011/0252137 A1 | 10/2011 | Stienhans et al. | |
| 2011/0282931 A1* | 11/2011 | Chen | H04L 61/605 709/203 |
| 2012/0079135 A1* | 3/2012 | Kalepu | H04L 67/2804 709/246 |
| 2012/0117222 A1* | 5/2012 | Holloway | G06Q 30/0277 709/224 |
| 2012/0134268 A1* | 5/2012 | Lopez | H04W 76/12 370/232 |
| 2012/0300615 A1* | 11/2012 | Kempf | H04L 41/0695 370/216 |
| 2013/0142055 A1* | 6/2013 | Bao | H04W 36/0044 370/252 |
| 2013/0155948 A1* | 6/2013 | Pinheiro | H04W 76/10 370/328 |
| 2013/0208729 A1* | 8/2013 | Evans | H04L 67/303 370/401 |
| 2013/0286869 A1* | 10/2013 | Woelker | H04W 12/80 370/252 |
| 2014/0112160 A1* | 4/2014 | Kamdar | H04W 72/02 370/252 |
| 2014/0146785 A1* | 5/2014 | Cavgalar | H04L 12/66 370/331 |
| 2014/0153674 A1* | 6/2014 | Stratigos, Jr. | H04B 7/022 375/340 |
| 2014/0226646 A1* | 8/2014 | Nishigori | H04W 8/04 370/338 |
| 2014/0226799 A1 | 8/2014 | Aggarwal et al. | |
| 2014/0226800 A1 | 8/2014 | Aggarwal et al. | |
| 2014/0229236 A1 | 8/2014 | Aggarwal et al. | |
| 2014/0229614 A1 | 8/2014 | Aggarwal et al. | |
| 2014/0274066 A1* | 9/2014 | Fodor | H04W 24/02 455/437 |
| 2014/0349641 A1* | 11/2014 | Jiang | H04W 24/08 455/432.3 |
| 2015/0023350 A1* | 1/2015 | Carames | H04L 45/74 370/392 |
| 2015/0055650 A1* | 2/2015 | Bhat | H04L 45/58 370/390 |
| 2015/0120902 A1* | 4/2015 | Belz | H04N 21/4788 709/224 |
| 2015/0124622 A1* | 5/2015 | Kowali | H04L 67/1006 370/236 |
| 2015/0142958 A1 | 5/2015 | Tamura et al. | |
| 2015/0201394 A1* | 7/2015 | Qu | H04W 4/20 455/456.1 |
| 2015/0244590 A1* | 8/2015 | Lin | H04L 45/745 370/392 |
| 2015/0350912 A1* | 12/2015 | Head | H04L 61/2007 726/4 |
| 2015/0373186 A1 | 12/2015 | Aggarwal et al. | |
| 2016/0007138 A1* | 1/2016 | Palanisamy | H04W 4/50 455/41.2 |
| 2016/0057607 A1* | 2/2016 | Dubesset | H04W 8/04 455/433 |
| 2016/0127486 A1* | 5/2016 | Chen | G06F 3/04842 709/206 |
| 2016/0197817 A1* | 7/2016 | Hayashitani | H04L 12/10 398/58 |
| 2016/0295384 A1* | 10/2016 | Shan | H04L 51/20 |
| 2016/0301655 A1* | 10/2016 | Lim | H04L 61/58 |
| 2016/0308748 A1* | 10/2016 | Zuo | H04W 76/25 |
| 2016/0315857 A1* | 10/2016 | Lubashev | H04L 12/4633 |
| 2017/0005918 A1* | 1/2017 | Agarwal | G06F 9/45558 |
| 2017/0149628 A1 | 5/2017 | Aggarwal et al. | |
| 2017/0280306 A1* | 9/2017 | Patel | H04W 4/10 |
| 2018/0084107 A1 | 3/2018 | Aggarwal et al. | |
| 2018/0176194 A1* | 6/2018 | Xiong | H04W 76/12 |
| 2019/0059005 A1* | 2/2019 | Yasukawa | H04W 24/02 |

FOREIGN PATENT DOCUMENTS

| | | |
|---|---|---|
| EP | 1523142 A1 | 4/2005 |
| EP | 1578087 A1 | 9/2005 |
| EP | 2843885 A1 | 3/2015 |
| JP | 2013-239913 A | 11/2013 |
| JP | 2014-003383 A | 1/2014 |
| JP | 2015-507383 A | 3/2015 |
| JP | 2015-149578 A | 8/2015 |
| WO | 2012/047488 A2 | 4/2012 |

OTHER PUBLICATIONS

International Search Report for PCT Application No. PCT/JP2015/077610 dated Jan. 19, 2016.
Extended European Search Report for European Patent Application No. 15905355.2 dated Jun. 12, 2019.

(56) References Cited

OTHER PUBLICATIONS

Office Action for Chinese Patent Application No. 201580083406.3. dated Jul. 3, 2020.
Notice of Allowance for Chinese Patent Application No. 201580083406.3 dated Nov. 2, 2021.
NEC launches world's first virtualized MVNO solution, China Academic Journal Eleclionic Publishing House, Feb. 28, 2014.

* cited by examiner

FIG. 3

| IMSI 301 | PROTOCOL BEFORE CONVERSION 302 | PROTOCOL AFTER CONVERSION 303 | DESTINATION 304 |
|---|---|---|---|
| IMSI_A | HTTP | HTTPS | https://server1.example.com/ |
| IMSI_B | HTTP | HTTPS | https://server2.example.com/ |
| IMSI_C | HTTP | HTTP | http://server3.example.com/ |
| IMSI_D | mqtt | mqtts | ... |
| IMSI_E | TCP | TCPS | ... |
| IMSI_F | Raw TCP socket | HTTPS | ... |
| ... | | | |

| IMSI | GROUP ID |
|---|---|
| IMSI_1A | Group A |
| IMSI_1B | Group B |
| IMSI_1C | Group C |
| IMSI_4X | Default |
| IMSI_4Y | Default |
| IMSI_4Z | Default |
| ... | ... |

| NODE ID | TRANSPORT IP ADDRESS | USER IP ADDRESS | GROUP ID | SUBNET | TRANSFER DESTINATION |
|---|---|---|---|---|---|
| Node 1 | 169.254.240.1 | 172.24.240.100 | Default | default_1 | Internet Only |
| Node 2 | 169.254.241.1 | 172.24.240.100 | Default | default_2 | Internet Only |
| Node 3 | 169.254.240.2 | 172.24.240.100 | Default | default_1 | Internet Only |
| Node 4 | 169.254.241.2 | 172.24.240.100 | Default | default_2 | Internet Only |
| Node A1 | 169.254.242.1 | 172.24.240.100 | Group A | subnet A1 | VPC Peering A |
| Node A2 | 169.254.243.1 | 172.24.240.100 | Group A | subnet A2 | VPC Peering A |
| Node B1 | 169.254.244.1 | 172.24.240.100 | Group B | subnet B1 | Direct Connect B |
| Node B2 | 169.254.245.1 | 172.24.240.100 | Group B | subnet B2 | Direct Connect B |
| Node C1 | 169.254.246.1 | 172.24.240.100 | Group C | subnet C1 | VPN connection C |
| Node C2 | 169.254.247.1 | 172.24.240.100 | Group C | subnet C2 | VPN connection C |
| ... | ... | ... | ... | ... | ... |

FIG. 7

CONTROL APPARATUS FOR GATEWAY IN MOBILE COMMUNICATION SYSTEM

This application is a continuation of International Patent Application No. PCT/JP2015/077610 filed on Sep. 29, 2015, the entire content of which is incorporated herein by reference.

TECHNICAL FIELD

The present invention relates to a control apparatus for a gateway in a mobile communication system.

BACKGROUND ART

In recent years, mobile communication services provided by an MVNO (Mobile Virtual Network Operator) have been widespread. The MVNO provides access to an external network to a UE (User Equipment) using network components owned by an MNO (Mobile Network Operator), and a gateway apparatus of MVNO. In addition, cloud services such as an AWS (Amazon Web Service) have also been spread. The AWS can change the number of servers to be used and their performance on demand and can provision a private network (closed network) in the cloud.

SUMMARY OF INVENTION

It is assumed that a gateway apparatus which provides an MVNO is created on a cloud using cloud characteristics, and the processing capability of the gateway apparatus is changed in accordance with a communication demand. If an existing gateway apparatus is simply provided on the cloud, it is difficult to provide a service based on a demand from users. An aspect of the present invention provides an object of solving various problems when providing a gateway apparatus in a mobile communication system on a cloud.

According to some embodiments of the present invention, there is provided a control apparatus for a gateway functioning as the endpoint of a core network in a mobile communication system, wherein the gateway includes a first server configured to receive data from a user apparatus and one or more second servers configured to transfer the data received by the first server to an external network, and the control apparatus performs an operation of changing performance of the one or more second servers, an operation of monitoring a processing status of the one or more second servers, and an operation of selecting, from the one or more second servers in accordance with the processing status of the one or more second servers, a second server as a transfer destination of the data received from the user apparatus by the first server.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

Figure 1:
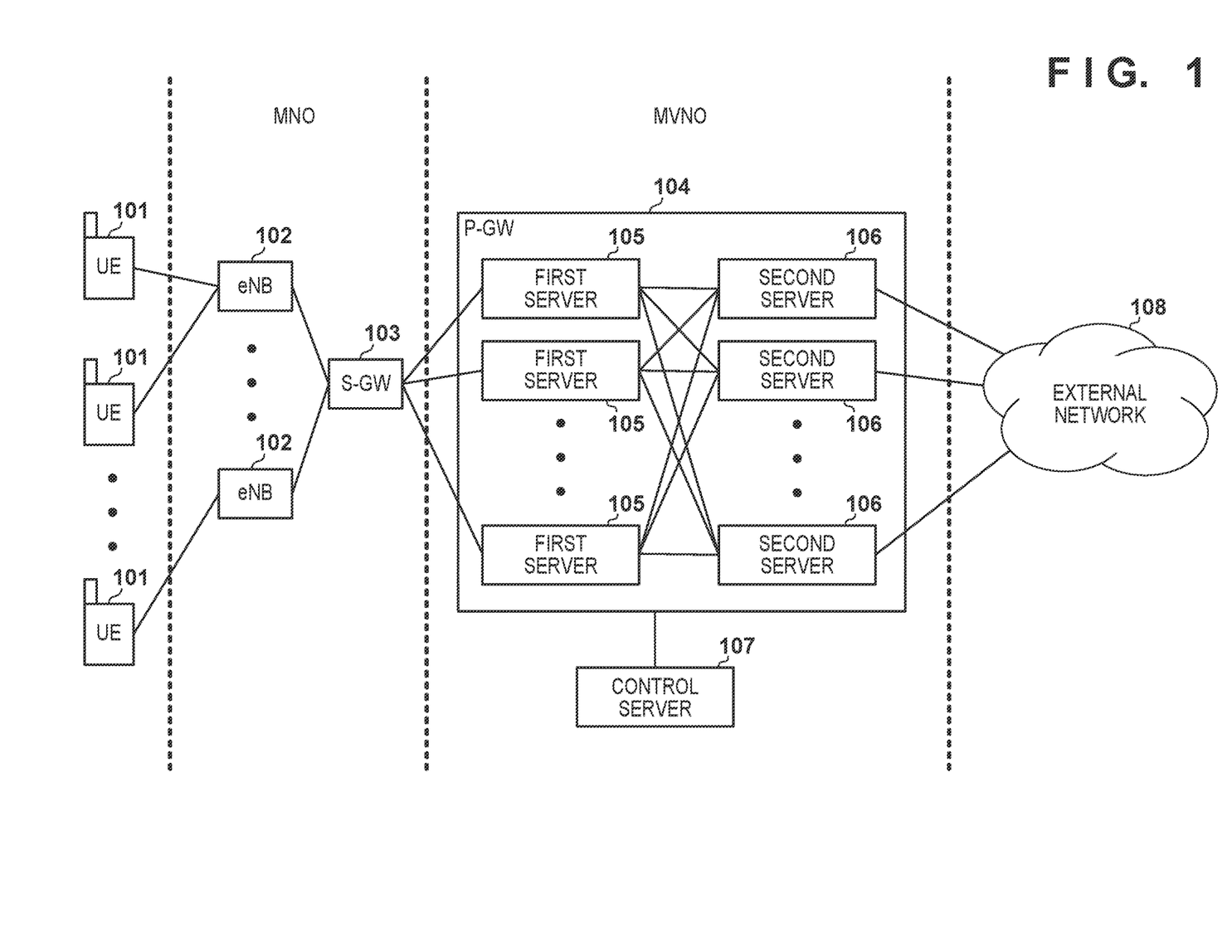
FIG. 1 is a block diagram for explaining an example of the arrangement of a mobile communication system according to some embodiments.

The arrangement of a mobile communication system according to some embodiments of the present invention will be described with reference to FIG. 1. Although a mobile communication system complying with LTE will be described with reference to FIG. 1, the present invention is also applicable to a mobile communication system complying with 3G or any other standard. The mobile communication system mainly includes eNBs 102, an S-GW 103, a P-GW 104, and a control server 107. The eNBs 102 and the S-GW 103 are provided by an MNO (Mobile Network Operator), and the P-GW 104 and the control server 107 are provided by an MVNO (Mobile Virtual Network Operator). The P-GW 104 and the control server 107 may be created by the MVNO itself, or may be created and operated by an MVNE (Mobile Virtual Network Enabler) according to an MVNO request. The S-GW 103 may be provided by the MVNO in place of the MNO.

UEs 101 are devices to which IMSIs (International Mobile Subscriber Identities) are assigned and can be, for example, mobile phones, personal computers, sensors, and actuators. The IMSI is identification information uniquely assigned to each device and is incorporated in the device in a state in which the IMSI is stored in, for example, a SIM.

Each eNB 102 connects each UE 101 to the S-GW 103 and transfers a packet between the UE 101 and the S-GW 103. Each eNB 102 further provides a wireless resource management function, a mobility management function, and a scheduling function to each UE 101. The S-GW 103 provides a function of routing a packet from or to each UE 101. The S-GW 103 corresponds to the SGSN (packet access control node) of a 3G network.

The P-GW 104 has a function of providing access to an external network 108 to each UE 101. The P-GW 104 is a gateway apparatus functioning as the endpoint of a core network included in the mobile communication system. The external network 108 may be a public network such as the Internet or a private network provided by each individual enterprise. The P-GW 104 corresponds to the GGSN (packet gateway node) of the 3G network. A packet from each eNB 102 to the P-GW 104 is transferred in an encapsulated form via a tunnel (GTP tunnel) established in accordance with a GTP (GPRS Tunneling Protocol). Any other L2 tunnel may be used in place of the GTP tunnel.

The P-GW 104 is formed from one or more first servers 105 and one or more second servers 106. Each first server 105 is connected to the S-GW 103 and transfers a packet received from the S-GW 103 to any one of the one or more second servers 106. Each first server 105 transfers, to the S-GW 103, a packet received by one of the one or more second servers 106.

Each second server 106 provides various services to the communications by the UE 101. For example, the second server 106 functions as NAT which performs processing in a network layer or a proxy which performs processing in an application layer. In addition, the second server 106 may perform processing for a still image and a moving image or credential assignment processing in place of the UE 101.

The upper limit of the number of servers simultaneously connectable to the S-GW 103 in the P-GW 104 is determined by the MNO. To solve this problem, the P-GW 104 is arranged as follows. The servers are classified into servers (first servers 105) which perform packet (data) exchange with the S-GW 103 and servers (second servers 106) which perform access to the external network 108 and provide various additional services, thereby increasing the number of second servers 106 so as to exceed the upper limit of connectable servers by the MNO.

Each of the one or more first servers 105 and each of the one or more second servers 106 can be virtual machines, respectively, on a cloud. This cloud may be a public cloud such as an AWS or a private cloud provided for one enterprise. If the cloud is a public cloud, the one or more first servers 105 and the one or more second servers 106 may belong to a virtual private network on the cloud. For example, if the cloud is an AWS, a virtual private network is provided by a VPC (Virtual Private Cloud) function.

The provision of the P-GW 104 on the cloud can change the performance of the P-GW 104 at an appropriate timing in accordance with the processing status of the P-GW 104. The change in performance of the P-GW 104 can be implemented by replacing (so-called scale up/scale down) one server with another server (a server having processing capability higher or lower than the previous server) or implemented by changing (so-called scale out/scale in) the number of servers.

The control server 107 is a server which controls the operation of the P-GW 104. The control server 107 may be a virtual machine on a cloud or an on-premise server. The control server 107 may be formed from a single server or a plurality of servers. In this embodiment, the control server 107 is exemplified as a server different from the first server 105 and the second server 106. However, one of the first servers 105 or one of the second servers 106 may have a function of the control server 107.

The control server 107 monitors the processing status of each of the one or more first servers 105 and each of the one or more second servers 106. Examples of the processing status of a monitoring target can be a CPU use rate, a memory use rate, a network use rate, an average throughput, the number of GTP sessions, and the like. A criterion of the processing status used to change the performance of the first server 105 may be different from a criterion of the processing status used to change the performance of the second server 106. Since the first server 105 performs the function of transferring a packet to the second server 106, the network performance tends to become a bottleneck. For this reason, the control server 107 may change the performance of the first server 105 using the network performance (for example, the network use rate, the average throughput, or the like) as a criterion. Since the second server 106 performs various processing operations for a packet, and its calculation performance tends to become a bottleneck. For this reason, the control server 107 may change the performance of the first server 105 using the calculation function (for example, the CPU use rate, the memory use rate, or the like) as a criterion.

The control server 107 may change the performance of the P-GW 104 regardless of the processing status of the P-GW 104. For example, the control server 107 may change the performance of the P-GW 104 in accordance with an instruction from the administrator or user of the mobile communication system. In place of this, the control server 107 may automatically change the performance of the P-GW 104 in accordance with the prescheduled settings.

Figure 7:
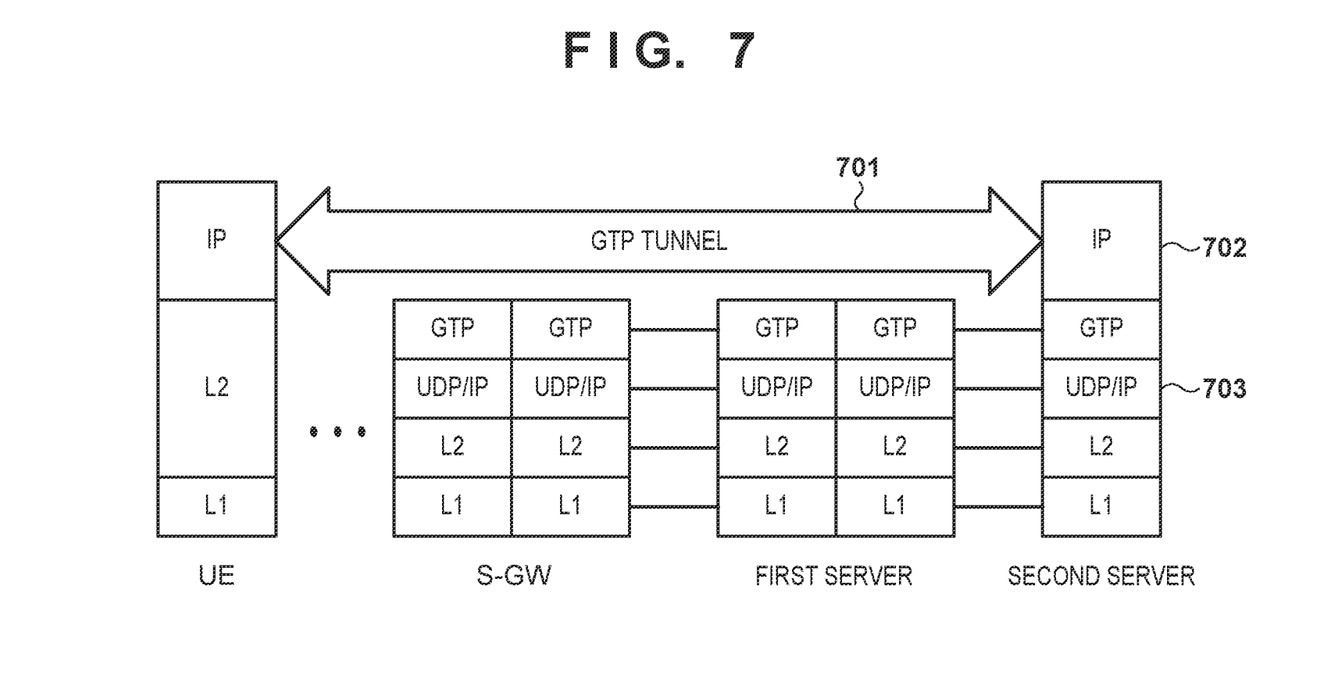
FIG. 7 is a block diagram for explaining an example of the protocol configuration of the mobile communication system according some embodiments.

Subsequently, an example of a protocol configuration of a U plane (user plane) of the mobile communication system in FIG. 1 will be described with reference to FIG. 7. An end-to-end GTP tunnel 701 is established between the UE 101 and the second server 106. A packet transmitted from the UE 101 is transferred to the second server 106 via the GTP tunnel 701. An IP address (to be referred to as a user IP address hereinafter) used in an IP connection 702 with the UE 101 and an IP address (to be referred to as a transport IP address hereinafter) used in an IP connection 703 with the first server 105 are assigned to the second server 106. An IP packet is transferred from the UE 101 via the IP connection 702, and a GTP packet is transferred from the first server 105 via the IP connection 703.

Since the virtual machines in the virtual private network communicate with each other depending on a cloud service, an IP address in a subnetwork assigned to the virtual private network must be set in each virtual machine. The upper limit of the number of IP addresses in the subnetwork is determined by a cloud service. If this IP address in the subnetwork is assigned to the UE 101, the number of UEs 101 connectable to the mobile communication system is limited by the number of IP addresses in the virtual private network. For this reason, an address irrelevant to the address in the virtual environment subnet is assigned to the UE 101, NAT is performed at the virtual environment address assigned to a node when IP communication is performed with the outside of the second server 106 which performs GTP tunnel termination. In addition, in the second server 106, an IP address in the subnetwork assigned to the virtual private network is set as a transport IP address for causing the first server 105 to access the second server 106. An IP address not limited by the virtual private network is set as a user IP address for causing the UE 101 to access the second server 106. If the user IP address is additionally assigned to the second server 106 which performs GTP tunnel termination, the communication from the UE 101 to the user IP address of the second server 106 can reach the second server 106 without any NAT.

Subsequently, an example of the operation of the mobile communication system in FIG. 1 will be described with reference to FIG. 2. This operation can be performed by causing a processor such as a CPU of each UE or each server to execute a program. In place of this, each UE and each server may include circuits (for example, ASICs) for executing the following operation.

In S1, the UE 101 is attached to the eNB 102 and requests to generate a session with the P-GW 104 to the core network. The UE 101 includes its own IMSI (to be referred to as an IMSI_A hereinafter) in this request. The S-GW 103 establishes a C-plane GTP tunnel (GTP-C) with one of the one or more first servers 105 and transfers the request from the UE 101 to the first server 105 via this GTP tunnel. For example, the S-GW 103 selects, by a round robin method, one first server 105 from the one or more first servers 105 connected to the S-GW 103.

Upon reception of the request from the UE 101, the first server 105 determines whether the first server 105 refers to customer information and a session is established for the IMSI included in the request. This determination may be performed by causing the first server 105 to refer to the customer information or performed by the control server 107 which has received the request from the first server 105. If the session can be established, the first server 105 assigns an IP address (to be referred to as 172.24.240.100) to the UE 101 and returns this IP address to the UE 101 in S2.

In S2, the first server 105 sends, to the control server 107, a request for assignment of the second server 106. In response to this request, the control server 107 selects one second server 106 of the one or more second servers 106 and returns the transport IP address of this second server 106 to the first server 105. The control server 107 may select one second server 106 (for example, a server having a minimum load) in accordance with the processing status of the one or more second servers 106. The first server 105 establishes a U-plane GTP tunnel (GTP-U) between the UE 101 and the selected second server 106. In addition, the first server 105 notifies each second server 106 of information concerning a pair of the IMSI of the UE 101 and the IP address assigned to the UE 101. This notification can be directly performed from the first server 105 to the second server 106 or may be performed via the control server 107. For example, the first server 105 may register information concerning the pair of the IMSI and the IP address in the control server 107, and the second server 106 may read out this information from the control server 107.

In S3, the UE 101 transmits, to the first server 105 via the GTP tunnel, an HTTP request toward the user IP address (to be referred to as 169.254.254.169) of the second server 106. The UE 101 sets the IP address (172.24.240.100) assigned in S2 in the transmission source IP address of this HTTP request. The user IP address of the second server 106 may be stored in the UE 101 before the start of the operation in S1 or may be notified from the first server 105 to the UE 101 in S2. A single IP address may be shared as the user IP addresses of the plurality of second servers 106.

In S4, the first server 105 transfers, to the second server 106 via the GTP tunnel established in S2, the GTP packet transmitted from the UE 101 via the GTP tunnel.

In S5, the second server 106 terminates the GTP tunnel to extract the IP packet from the GTP packet. In addition, the second server 106 resolves the IMSI of the UE 101 which has transmitted the HTTP request by using the information concerning the pair notified in S2 and the transmission source IP address of this HTTP request. In place of this, the second server 106 may transmit this transmission source IP address (the IP address of the UE 101) to the control server 107, cause the control server 107 to resolve the IMSI, and return it to the second server 106.

In S6, the second server 106 sends an inquiry about processing to be executed to the resolved IMSI to the control server 107. This processing includes processing to data transmitted from the UE 101 to the external network 108 and processing to data returned from the external network 108 to the UE 101. The control server 107 manages a table 300 shown in FIG. 3. Each entry of the table 300 indicates the processing contents to be executed for the data from the UE 101. A column 301 indicates the IMSI of the UE 101 as the processing target. A column 302 indicates a request protocol before conversion. A column 303 indicates a request protocol after conversion. A column 304 indicates a request destination. For example, the first-row entry of the table 300 indicates that an HTTP request from the UE 101 having the IMSI_A is converted into an HTTPS request and the converted request is transferred to https://server1.example.com/. The second server 106 can perform individual processing for each UE 101. For example, the second server 106 can similarly perform conversion from mqtt to mqtts, conversion from TCP to TCPS, and conversion from Websocket to Websocket over SSL. In addition to simple encryption, the second server 106 can perform conversion of a protocol itself such as HTTPS transfer of data received by a Raw TCP socket or data received by a UDP packet, and communication optimization between the UE 101 and the second server 106 such as compression of response contents from the external server or deletion of unnecessary header information. The latter function is particularly advantageous in a device such as a sensor or actuator aiming at energy saving.

Figure 3:
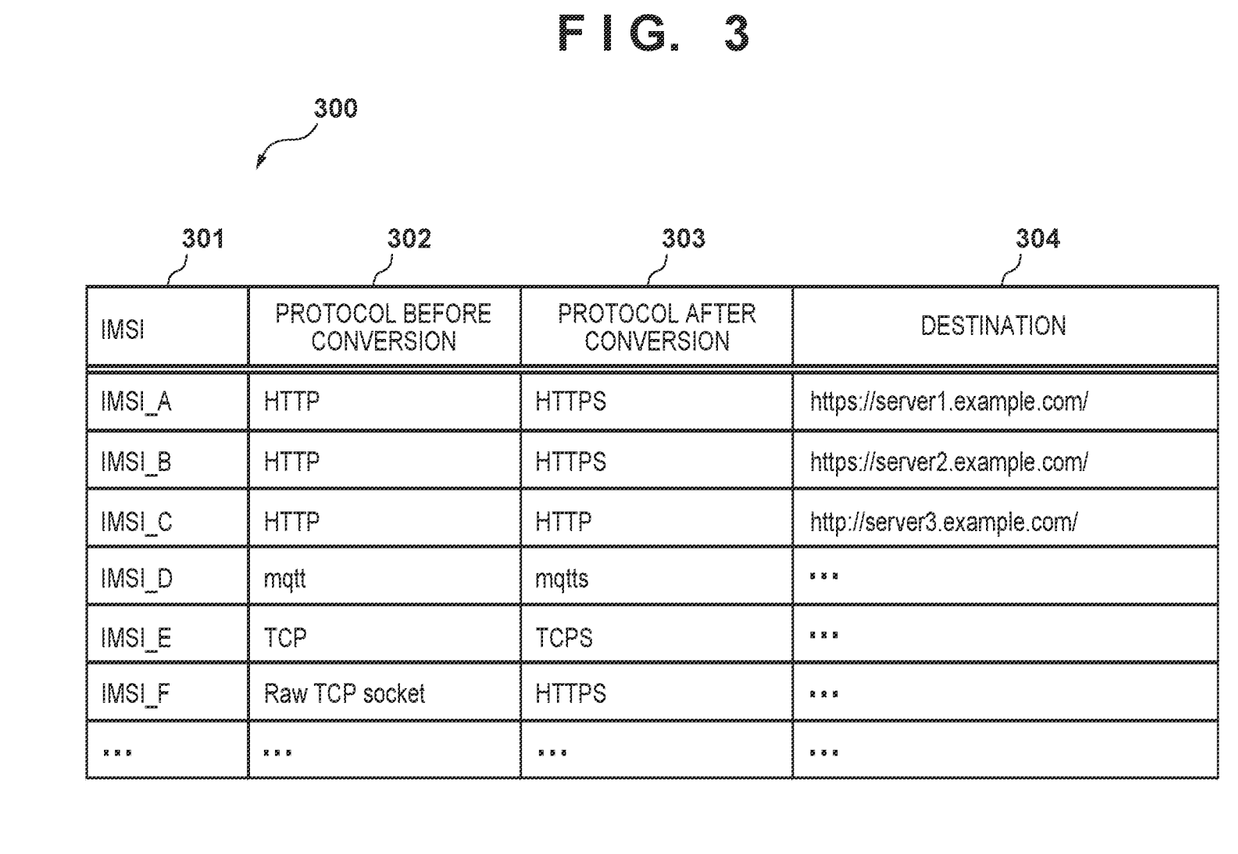
FIG. 3 explains an example of a management table of the mobile communication system according to some embodiments.

In addition to the protocol conversion, the second server 106 can add authentication information such as the user name and password of a site to be accessed by the UE 101, and add information referred to in processing on the server side, such as an identification number such as the IMEI (International Mobile Equipment Identifier) of the UE 101 and a time stamp indicating data reception time. The second server 106 can also add a digital signature using secret information exchanged in advance with the reception side so as to allow the reception side to verify the authentication of the added information. Accordingly, access by spoofing of the third party can be prevented.

The control server 107 provides an API for editing the table 300. Via this API (Application Programming Interface), the administrator of the UE 101 can edit (for example, add, change, or delete) the operations to be performed for his own UE 101. Similarly, by using the API, the administrator of the UE 101 can also set information such as a user name and password for authentication and secret information for verifying authenticity of the information added by the second server 106. The control server 107 may provide a GUI (Graphical User Interface) for allowing the administrator of the UE 101 to facilitate the above processing.

In S7, the control server 107 responds, to the second server 106, the operations to be performed of an entry indicating the result obtained by searching the table 300 using, as a key, the IMSI received from the second server 106.

In S8, the second server 106 converts the HTTP request from the UE 101 into the HTTPS request in accordance with the operations to be performed received from the control server 107 and transfers the HTTPS request to the destination (https://server1.example.com/) designated by the processing contents. In S9, the second server 106 receives a response to the HTTPS request from the destination. In S10, the second server 106 adds a GTP header to this response and transfers the resultant data to the first server 105. The first server 105 as the transfer destination is the same as the first server 105 from which the HTTP request has been transferred in S4. In S11, the first server 105 transfers the response to the UE 101 via the GTP tunnel. After that, the first server 105 may cancel the GTP tunnel between the UE 101 and the second server 106.

According to the above processing, the common user IP address is assigned to the plurality of second servers 106. Since the communication between the first server 105 and the second server 106 is identified by the transport IP address assigned to each second server 106, identifiable GTP tunnels are established between the plurality of UEs 101 and the plurality of second servers 106. For this reason, even if the scale in/scale out operation or the scale down/ scale up operation of the second server 106 is performed, the endpoint used as the destination of the UE 101, that is, the user IP address of the second server 106 need not be changed.

According to the above processing, since the user IP address of the second server 106 can be set in advance in the UE 101, the overhead concerning the DNS processing for obtaining this IP address can be suppressed. In addition, the user IP address of the second server 106 can be set as a hardcode in the UE 101. This is particularly advantageous when the UE 101 is a weak embedded device such as a sensor. Even if the user IP address of the second server 106 set in the UE 101 cannot be changed, the communication partner of the UE 101 in the external network 108 can be changed by updating the table 300 of the control server 107.

Subsequently, communication between the first server 105 and the second server 106 in the processing of FIG. 2 will be described in detail. Although only one S-GW 103 is illustrated in FIG. 1, a general mobile communication system includes a plurality of S-GWs 103. A GTP tunnel between the S-GW 103 and the P-GW 104 (the first server 105 in practice) can be identified by a TEID (Tunnel Endpoint IDentifier). Each first server 105 uniquely sets the TEID of the GTP tunnel with the S-GW 103 to prevent the interference between the GTP tunnels. However, if the respective first servers 105 set the same TEID for the respective GTP tunnels and packets are transferred to the same second server from the respective GTP tunnels, the interference occurs between the GTP tunnels.

To solve this problem, the control server 107 may monitor the TEID assigned by each first server 105 and may select the second server 106 to which the packet is transferred from the first server 105 so as to prevent the interference between the GTP tunnels in the second servers 106. More specifically, the control server 107 may select the second server 106 to which the packet is transferred from the first server 105 so as to prevent the TEIDs assigned by the respective servers 105 from overlapping in the second servers 106.

In place of this, another tunnel different from the GTP tunnel between the S-GW 103 and the first server 105 may be set between the first server 105 and the second server 106, and a packet may be transferred from the first server 105 to the second server 106 via the other tunnel. The tunnel between the first server 105 and the second server 106 may be a GTP tunnel. Accordingly, the same software stack can be used in the first server 105 and the second server 106.

In the above embodiment, the second server 106 terminates the GTP packet from the UE 101 to extract the IP address included in this GTP packet. In place of this, a third server different from the second server 106 may terminate a GTP packet from the UE 101. In this case, the UE 101 sets the destination IP address of the IP packet as the user IP address of the third server. The second server 106 transfers, to the third server via the GTP tunnel or the other tunnel, the GTP packet transferred from the first server 105.

Figure 4:
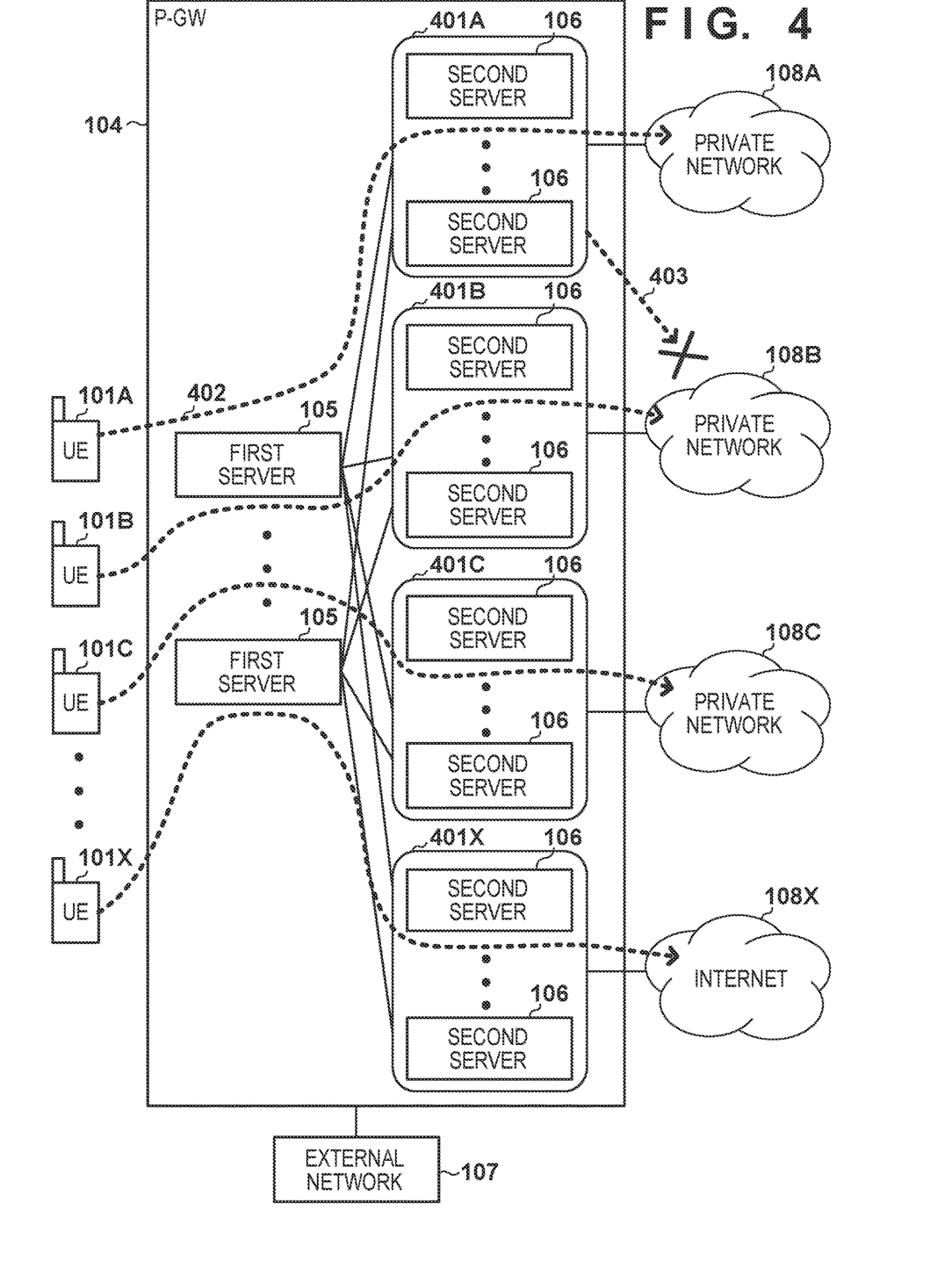
FIG. 4 is a block diagram for explaining an example of the arrangement of a mobile communication system according to some embodiments.

Subsequently, the arrangement of a mobile communication system according to another embodiment of the present invention will be described with reference to FIG. 4. The mobile communication system in FIG. 4 is different from the mobile communication system in FIG. 1 in the arrangement of a P-GW 104 and the operation of a control server 107. The rest may be the same as in the mobile communication system in FIG. 1. In FIG. 4, some constituent elements which are the same as those of the mobile communication system in FIG. 1 will not be illustrated. The same description as in FIG. 1 will be omitted.

A user having a UE 101 connectable to the mobile communication system may want to access his own private network using this UE 101 without going through the public network such as the Internet. For example, assume that a given enterprise purchases a plurality of SIMs and UEs assigned with these SIMs access the private network of this enterprise. Even if a second server 106 belongs to the virtual private network on a cloud, the second server 106 can access another private network by a function provided by the cloud. The accessible other private network is another virtual private network present on the same cloud as the second server 106 and different from the virtual private network to which the second server 106 belongs, or a private network of the on-premise or another cloud connected by a leased line to the virtual private network to which the second server 106 belongs.

The UE 101 of another user having no access right to a given private network of a given user should not access this private network. Due to the limitation of the cloud service, only single transfer information may be set for all servers belonging to the same subnetwork in the virtual private network. The transfer information here is information for defining an external network which the UE 101 can access. The transfer information includes, for example, a routing policy defined by a routing table, and an NACL (Network Access Control List) for access limitation. In the embodiment shown in FIG. 1, if all the second servers 106 are included in the same subnetwork, the single transfer information is applied to all the UEs 101 which can use this mobile communication system. As a result, the UEs 101 which can access the external private network cannot be limited.

In this embodiment, the plurality of second servers 106 are divided into a plurality of groups, the respective groups are included in different subnetworks, and the transfer information is defined for each group. In the embodiment shown in FIG. 4, the plurality of second servers 106 are classified into groups 401A, 401B, 401C, and 401X. Each group includes at least one second server 106. As in the embodiment shown in FIG. 1, the control server 107 can change the performance of each second server 106 included in each group, as needed. The second servers 106 belonging to the group 401A can access only a private network 108A. For example, the private network 108A is another virtual private network of the same cloud as the second servers 106. If this cloud is the AWS, these virtual private networks can be implemented by the VPC function and are connected by the VPC peering function. The second servers 106 included in the group 401B can access only a private network 108B. For example, the private network 108B is an on-premise private network. If the second servers 106 are included in the AWS, the second servers 106 and the private network 108B are connected by dedicated lines by the AWS Direct Connect function. The second servers 106 included in the group 401C can access only a private network 108C. For example, the private network 108A is another virtual private network of the same cloud as the second servers 106. If this cloud is the AWS, these virtual private networks are implemented by the VPC function and are connected by the VPN connection function. The private networks 108A to 108C are networks managed by different users. The second servers 106 included in the group 401X can access only the Internet 108X. The one or more first servers 105 may belong to a subnetwork different from those of the second servers 106 or may belong to a virtual network different from those of the second servers 106.

Figure 5A:
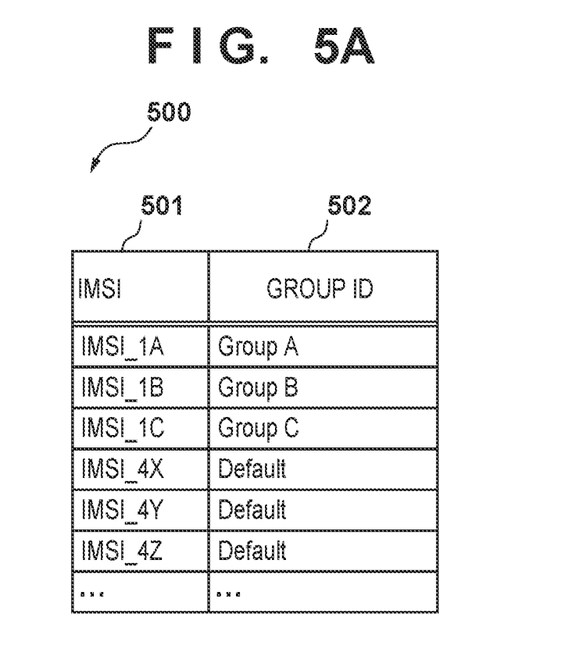
FIG. 5A explains an example of a management table in the mobile communication system according to some embodiments.
Figure 5B:
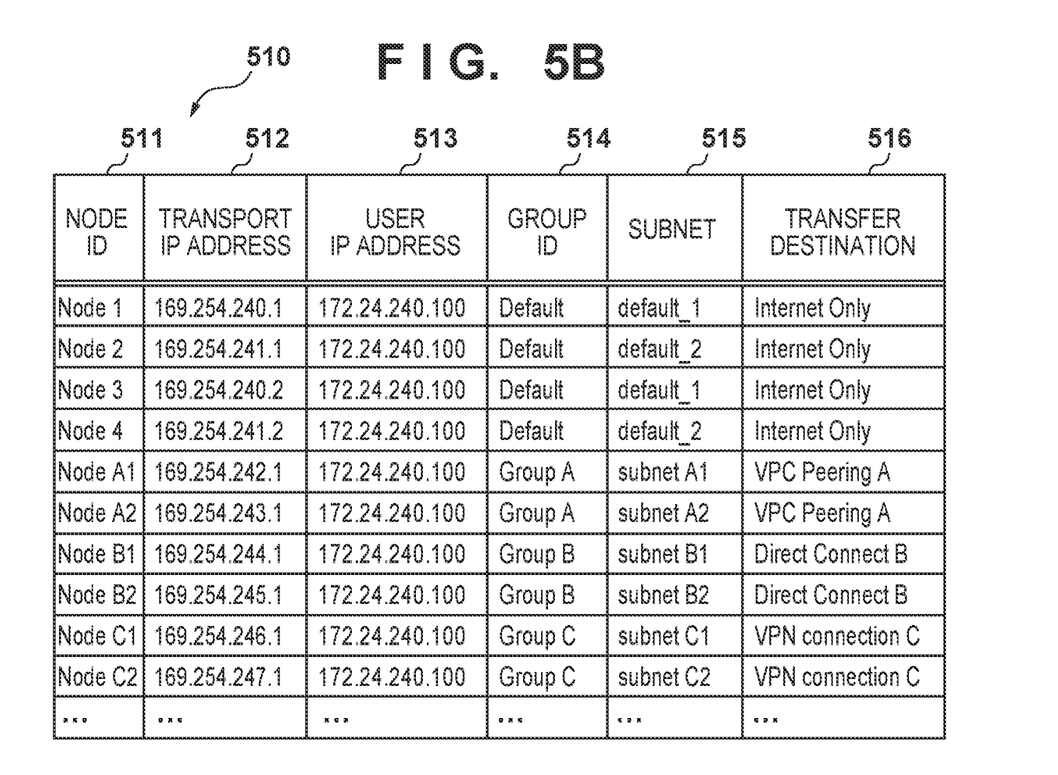
FIG. 5B explains an example of a management table in the mobile communication system according to some embodiments.

Subsequently, the above transfer information will be described with reference to FIGS. 5A and 5B. The transfer information is formed from two tables 500 and 510 and managed by the control server 107. The table 500 defines that a packet from each UE 101 should be processed by the second server 106 of a specific group. Each entry (row) of the table 500 is generated for each IMSI. A column 501 indicates an IMSI. A column 502 indicates the group of the second server 106 which processes a packet from the UE 101 having each IMSI.

The table 510 indicates information concerning second servers 106. Each entry (row) of the table 510 is generated for each second server 106. A column 511 indicates an identifier of the second server 106. The identifier of the second server 106 is unique in the mobile communication system. A column 512 indicates the transport IP address of the second server 106. The transport IP address is set for each second server 106. A column 513 indicates the user IP address of the second server 106. The common user IP address may be set for the plurality of second servers 106 or user IP addresses may be set for the plurality of second servers, respectively, as in the above embodiment. If the user IP address of the second server 106 is set in the UE 101 in advance, the table 510 need not include the column 513. A column 514 indicates the identifier of a group to which the second server 106 belongs. The group identifier is unique in the mobile communication system. A column 515 indicates a subnetwork to which the second server 106 belongs. A column 516 indicates the external network of packet transfer destination of the second server 106. The common transfer destination is set for the second servers 106 belonging to the same group. The administrator (for example, MVNO) of the mobile communication system creates and updates the tables 500 and 510 in accordance with a request from the user of the mobile communication system.

Figure 6:
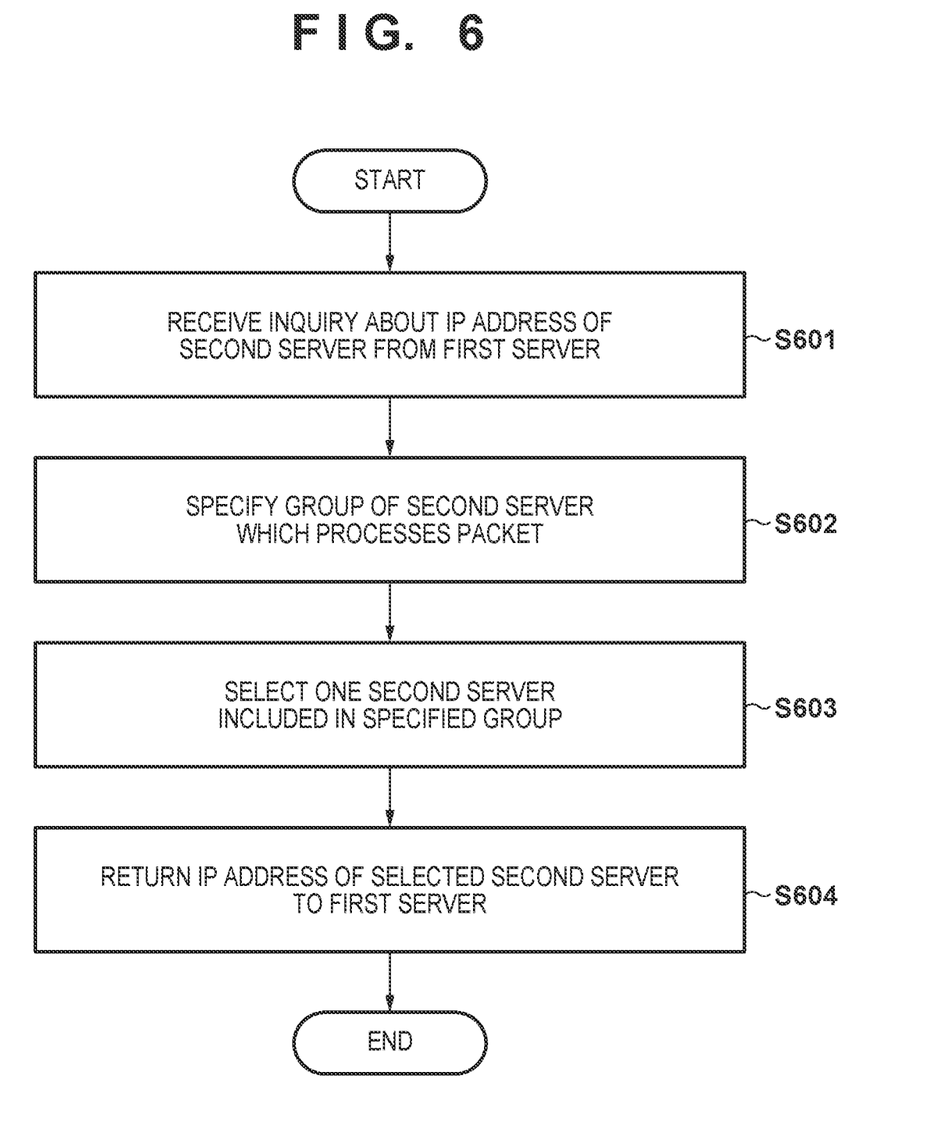
FIG. 6 is a flowchart for explaining an example of the operation of a control server according to some embodiments.

Subsequently, an example of the operation of the control server 107 will be described with reference to FIG. 6. This operation can be done by causing a processor such as the CPU of the control server 107 to execute a program. In place of this, the control server 107 may include a circuit (for example, ASIC) which execute the following operation. The operation in FIG. 6 is performed in S2 of FIG. 2. In the following description, a case in which the first server 105 sends, to the control server 107, an inquiry about the transport IP address of the second server 106 and the user IP address of the second server 106 will be described below. As described above, however, the user IP address of the second server 106 may be set in the UE 101 in advance. In this case, processing about the user IP address of the second server 106 in the following description may be omitted.

In S601, the control server 107 receives an inquiry to obtain the transport IP address and user IP address of the second server 106 from the first server 105. This inquiry includes the IMSI of the UE 101 received from the UE 101 in S1 of FIG. 2 to the first server 105.

In S602, the control server 107 specifies the group of the second servers 106 which are to process a packet from the UE 101 having the IMSI received in S601 with reference to the table 500. For example, if the IMSI received by the control server 107 is "IMSI_1A", the control server 107 specifies that the second servers 106 included in "Group A" should process the packet from the UE 101 having this IMSI.

In S603, the control server 107 specifies the second servers included in the specified group and selects one of the second servers with reference to the table 510. For example, if the group specified by the control server 107 is "Group A", the control server 107 specifies "Node A1" and "Node A2" as the second servers 106 included in this group. The control server 107 may select one second server 106 based on the processing status of each second server 106 included in the specified group. For example, the control server 107 selects the second server 106 having a lowest load.

In S604, the control server 107 reads out the transport IP address and user IP address of the selected second server 106 from the table 510 and returns this transport IP address to the first server 105 as the inquiry source.

Figure 2:
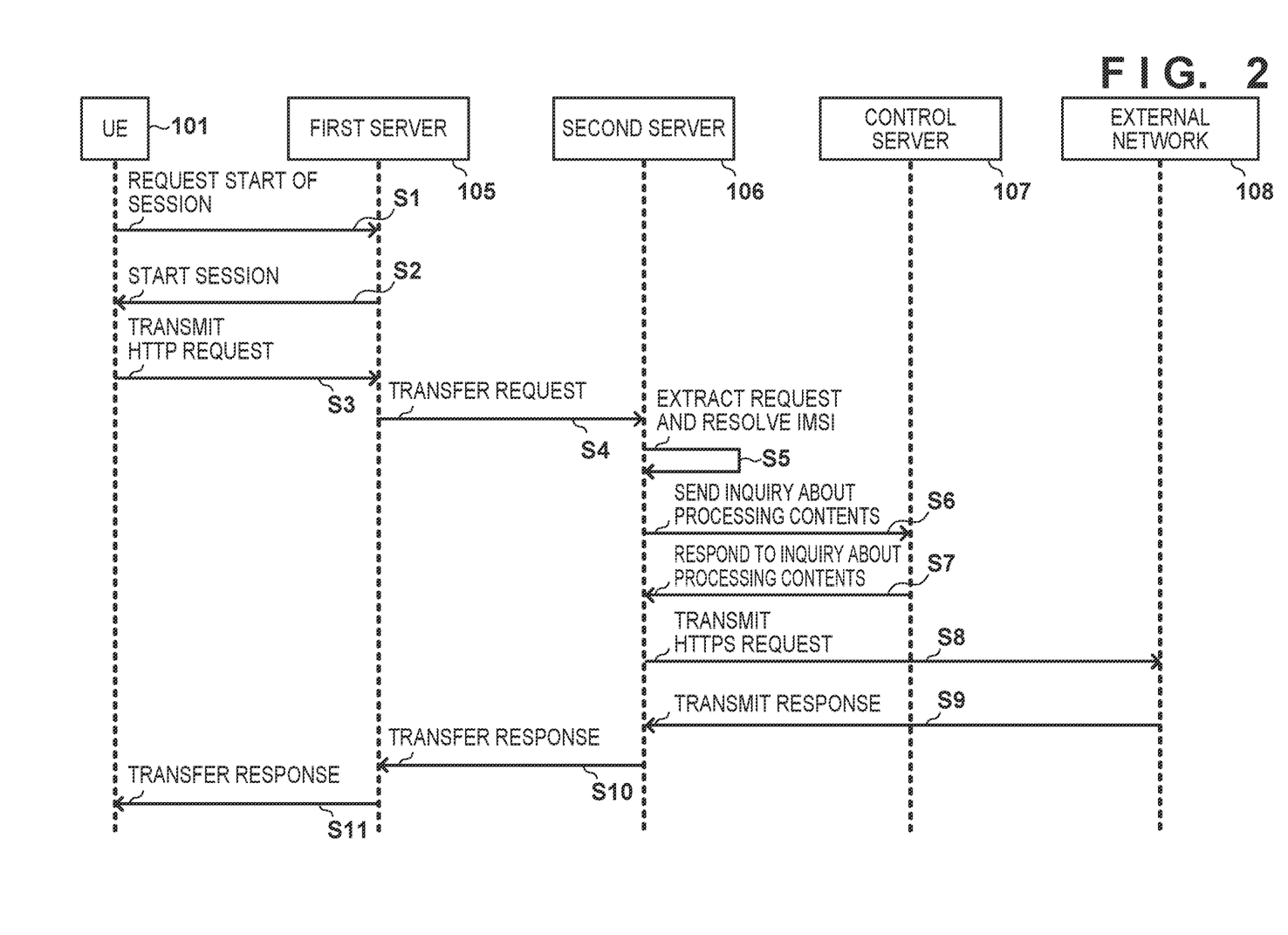
FIG. 2 is a timing chart for explaining an example of the operation of the mobile communication system according to some embodiments.

In S3 of FIG. 2, the first server 105 then notifies the UE 101 of the user IP address of the selected second server 106. In S4 of FIG. 2, the UE 101 transmits, to the first server 105, the HTTP request toward the user IP address of the selected second server 106. In S5 of FIG. 2, the first server 105 transfers the packet to the selected second server 106 using the transport IP address of the second server 106 obtained in S604. After that, the second server 106 transfers the packet to the external network 108 in accordance with the transfer information set in the subnetwork to which this second server 106 belongs.

The packet from a UE 101A whose IMSI is "IMSI_1A" is transferred to the second servers 106 included in the group 401A. Since the second servers 106 included in the group 401A can access only the private network 108A, the packet from the UE 101A is transferred to only the private network 108A, as indicated by a dotted line 402, but is not transmitted to other private networks, as indicated by a dotted line 403. Similarly, a UE 101B is transferred to only the private network 108B via the second servers 106 included in the group 401B. A UE 101C is transferred to only the private network 108C via the second servers 106 included in the group 401C. A UE 101X in which access to a private network is not set is transferred to only the Internet 108X via the second servers 106 included in the default group 401X.

In the embodiment shown in FIG. 4, the second server 106 terminates the GTP tunnel, extracts the IP packet, and then transfers the IP packet to the external network via the L3 connection. However, depending on a cloud service, the number of peer-connectable virtual networks and the number of virtual interfaces for private connections are limited. As a result, the number of private networks connectable to the P-GW 104 is limited. To solve this problem, the second server 106 may set the L2 tunnel with the server in the external private network and transfer the packet via the L2 tunnel. If the L2 tunnel is used, processing using the IP address of the UE 101 can be performed on the private network side. Whether the L2 tunnel or L3 connection is used can be set for each private network.

In the above description, a case in which the MVNO manages the P-GW 104 has been described. However, the present invention is also applicable when the MNO manages the P-GW 104. A case in which P-GW 104 is L2-connected to the UE 101 has been described above. However, the present invention is also applicable when the P-GW 104 is L3-connected to the UE 101.

In each embodiment described above, the first servers 105 may be classified into a C-plane server for performing communication with the S-GW 103 on the C plane and a P-plane server for performing communication with the S-GW 103 on the P plane. In addition, the C-plane servers can also be classified into a server for receiving data from the S-GW 103 via the GTP tunnel and a server for decapsulating this data and extracting the IP packet.

The present invention is not limited to the above-described embodiments, and various changes and modifications can be made within the spirit and scope of the present invention. Therefore, to apprise the public of the scope of the present invention, the following claims are made.

The invention claimed is:

1. A communication system comprising a gateway and a control apparatus for controlling the gateway, wherein
the gateway is a P-GW or GGSN, the gateway including a first server configured to receive data from a user apparatus and two or more second servers configured to transfer the data received by the first server to an external network,
the control apparatus performs
an operation of changing performance of the two or more second servers,
an operation of monitoring a processing status of the two or more second servers, and
an operation of selecting, from the two or more second servers in accordance with the processing status of the two or more second servers, a second server as a transfer destination of the data received from the user apparatus by the first server, and
the two or more second servers share a common first IP address for use in a connection with the user apparatus and at least two second respective IP addresses for use by individual ones of the second servers in a connection with the first server,
the second respective IP addresses being different from the common first IP address,
the second respective IP addresses of the two or more second servers are different from each other,
the first server receives data that the user apparatus has transmitted to the common first IP address that is shared by the two or more second servers,
the control apparatus selects one second server from the two or more second servers, and
the first server transmits the data to the second respective IP address of the selected second server.

2. The system according to claim 1, wherein the second server selected by the control apparatus performs processing in one of a network layer and an application layer for data transferred from the first server.

3. The system according to claim 1, wherein the second server selected by the control apparatus transfers, to another server configured to perform processing in one of a network layer and an application layer for data, the data transferred from the first server.

4. The system according to claim 1, wherein
the first server receives data from the user apparatus via an L2 tunnel, and
the first server transfers the data, via an L2 tunnel different from the L2 tunnel, to the second server selected by the control apparatus.

5. The system according to claim 1, wherein
the gateway includes a plurality of first servers,
the first server receives data from the user apparatus via an L2 tunnel, and
the control apparatus selects the second server serving as a transfer destination of data received from the user apparatus by the first server so as not to overlap identifiers of the L2 tunnels in the second servers.

6. The system according to claim 1, wherein
the gateway includes two or more first servers,
the two or more first servers are virtual machines on a cloud,
the control apparatus further performs
an operation of changing performance of the two or more second servers, and
an operation of monitoring a processing status of the two or more second servers, and
the control apparatus performs a change in performance of the two or more first servers and the change in performance of the two or more second servers based on different criteria.

7. The system according to claim 6, wherein the control apparatus performs the change in the performance of the two or more first servers based on network performance, and the change in the performance of the two or more second servers based on calculation performance.

8. The system according to claim 1, wherein the second servers and the external network communicate with each other via the L2 tunnel.

9. The system according to claim 1, wherein the second servers and the external network communicate with each other via an L3 connection.

10. The system according to claim 1, wherein the two or more second servers are virtual machines on a cloud.

* * * * *

UNITED STATES PATENT AND TRADEMARK OFFICE
CERTIFICATE OF CORRECTION

PATENT NO. : 11,805,429 B2
APPLICATION NO. : 15/764122
DATED : October 31, 2023
INVENTOR(S) : Kenta Yasukawa, Ken Tamagawa and Daichi Funato It is certified that error appears in the above-identified patent and that said Letters Patent is hereby corrected as shown below:

In the Claims

Claim 4, Column 12, Line 9:
"via an L2" should read as --via another L2--.

Signed and Sealed this
Seventh Day of May, 2024

Katherine Kelly Vidal
*Director of the United States Patent and Trademark Office*